United States Patent
Sim et al.

(10) Patent No.: US 11,216,701 B1
(45) Date of Patent: Jan. 4, 2022

(54) UNSUPERVISED REPRESENTATION LEARNING FOR STRUCTURED RECORDS

(71) Applicant: Amazon Technologies, Inc., Seattle, WA (US)

(72) Inventors: Yen Ling Adelene Sim, Seattle, WA (US); Andrew Borthwick, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 918 days.

(21) Appl. No.: 15/955,617

(22) Filed: Apr. 17, 2018

Related U.S. Application Data

(60) Provisional application No. 62/628,818, filed on Feb. 9, 2018.

(51) Int. Cl.
| | | |
|---|---|---|
| *G06K 9/62* | (2006.01) | |
| *G06K 9/72* | (2006.01) | |
| *G06N 20/00* | (2019.01) | |
| *G06F 16/28* | (2019.01) | |
| *G06N 3/08* | (2006.01) | |

(52) U.S. Cl.
CPC ........... *G06K 9/627* (2013.01); *G06F 16/285* (2019.01); *G06K 9/6261* (2013.01); *G06K 9/723* (2013.01); *G06N 3/088* (2013.01); *G06N 20/00* (2019.01)

(58) Field of Classification Search
CPC ........ G06N 3/088; G06N 20/00; G06K 9/627; G06K 9/723; G06K 9/6261; G06F 16/285
See application file for complete search history.

(56) References Cited

U.S. PATENT DOCUMENTS

| | | | | |
|---|---|---|---|---|
| 2010/0095310 A1* | 4/2010 | Oshins | ............. | G06F 9/45558 719/327 |
| 2015/0154685 A1* | 6/2015 | Pope | ............. | G06Q 30/0625 705/26.62 |

OTHER PUBLICATIONS

Biswas et al., "MRNet-Product2Vec: A Multi-task Recurrent Neural Network for Product Embeddings", Joint European Conference on Machine Learning and Knowledge Discovery in Databases, Available online at <https://arxiv.org/abs/1709.07534>, 2017, 12 pages.
Kim, Joshua, "Understanding How Convolutional Neural Network (CNN) Perform Text Classification with Word Embeddings", Available online at <https://towardsdatascience.com/understanding-how-convolutional-neural-network-cnn-perform-text-classification-with-word-d2ee64b9dd0b>, Dec. 2, 2017, 5 pages.
Kwyk, "A Non-NLP application of Word2Vec", Available online at <https://towardsdatascience.com/a-non-nlp-application-of-word2vec-c637e35d3668>, Jul. 31, 2017, 6 pages.
Sarkar, Dipanjan, "A Hands-on Intuitive Approach to Deep Learning Methods for Text Data—Word2Vec, GloVe and FastText", Available online at <https://towardsdatascience.com/understanding-feature-engineering-part-4-deep-learning-methods-for-text-data-96c44370bbfa>, Mar. 14, 2018, 51 pages.

* cited by examiner

*Primary Examiner* — Robert G Bachner
(74) *Attorney, Agent, or Firm* — Nicholson De Vos Webster & Elliott LLP

(57) ABSTRACT

Techniques for generating record embeddings from structured records are described. A record embeddings generating engine processes structured records to build a token vocabulary. Token embeddings are created for each token in the vocabulary. The token embeddings are trained using a loss function that relates the token embeddings to the record-attribute-data structure of the structured records. A record embedding is assembled from the trained token embeddings.

17 Claims, 13 Drawing Sheets

300 the
shawshank
redemption
crime
drama
tim
robbins
morgan
freeman
bob
gunton
godfather
marlon
brando
al
pacino
james
caan
schindlers
list
biography
history
liam
neeson
ralph
fiennes
ben
kingsley

*FIG. 3*

$tokenEm_{the}$ = [ $the_1$, ..., $the_{Dem}$ ] }—410
$tokenEm_{shawshank}$ = [ $shawshank_1$, ..., $shawshank_{Dem}$ ]
$tokenEm_{redemption}$ = [ $redemption_1$, ..., $redemption_{Dem}$ ]
$tokenEm_{crime}$ = [ $crime_1$, ..., $crime_{Dem}$ ]
$tokenEm_{drama}$ = [ $drama_1$, ..., $drama_{Dem}$ ]
$tokenEm_{tim}$ = [ $tim_1$, ..., $tim_{Dem}$ ]
$tokenEm_{robbins}$ = [ $robbins_1$, ..., $robbins_{Dem}$ ]
$tokenEm_{morgan}$ = [ $morgan_1$, ..., $morgan_{Dem}$ ]
$tokenEm_{freeman}$ = [ $freeman_1$, ..., $freeman_{Dem}$ ]
$tokenEm_{bob}$ = [ $bob_1$, ..., $bob_{Dem}$ ]
$tokenEm_{gunton}$ = [ $gunton_1$, ..., $gunton_{Dem}$ ]
$tokenEm_{godfather}$ = [ $godfather_1$, ..., $godfather_{Dem}$ ]
$tokenEm_{marlon}$ = [ $marlon_1$, ..., $marlon_{Dem}$ ]
$tokenEm_{brando}$ = [ $brando_1$, ..., $brando_{Dem}$ ] }—400
$tokenEm_{al}$ = [ $al_1$, ..., $al_{Dem}$ ]
$tokenEm_{pacino}$ = [ $pacino_1$, ..., $pacino_{Dem}$ ]
$tokenEm_{james}$ = [ $james_1$, ..., $james_{Dem}$ ]
$tokenEm_{caan}$ = [ $caan_1$, ..., $caan_{Dem}$ ]
$tokenEm_{schindlers}$ = [ $schindlers_1$, ..., $schindlers_{Dem}$ ]
$tokenEm_{list}$ = [ $list_1$, ..., $list_{Dem}$ ]
$tokenEm_{biography}$ = [ $biography_1$, ..., $biography_{Dem}$ ]
$tokenEm_{history}$ = [ $history_1$, ..., $history_{Dem}$ ]
$tokenEm_{liam}$ = [ $liam_1$, ..., $liam_{Dem}$ ]
$tokenEm_{neeson}$ = [ $neeson_1$, ..., $neeson_{Dem}$ ]
$tokenEm_{ralph}$ = [ $ralph_1$, ..., $ralph_{Dem}$ ]
$tokenEm_{fiennes}$ = [ $fiennes_1$, ..., $fiennes_{Dem}$ ]
$tokenEm_{ben}$ = [ $ben_1$, ..., $ben_{Dem}$ ]
$tokenEm_{kingsley}$ = [ $kingsley_1$, ..., $kingsley_{Dem}$ ]

*FIG. 4*

$$rEm_0 = [\ aEm_{title}^{r=0}\ |\ aEm_{genre}^{r=0}\ |\ aEm_{cast}^{r=0}\ ] \text{---} 610$$

$$rEm_1 = [\ aEm_{title}^{r=1}\ |\ aEm_{genre}^{r=1}\ |\ aEm_{cast}^{r=1}\ ]$$

$$rEm_2 = [\ aEm_{title}^{r=2}\ |\ aEm_{genre}^{r=2}\ |\ aEm_{cast}^{r=2}\ ]$$

UNSUPERVISED REPRESENTATION LEARNING FOR STRUCTURED RECORDS

CROSS-REFERENCE TO RELATED APPLICATIONS

This application claims the benefit of U.S. Provisional Application No. 62/628,818, filed Feb. 9, 2018, which is hereby incorporated by reference.

BACKGROUND

In computing, certain tasks such as classification, regression, and recommendation are often difficult to implement with traditional programming techniques in which the programmer must expressly define features of the data for comparison. As a result, machine learning techniques like artificial neural networks are being employed for such tasks. The length of time and computing requirements (e.g., processors, memory, etc.) required to train a model using a machine learning algorithm typically increase as the dimensionality of the underlying dataset increases.

Structured records—e.g., records with attributes having values—are pervasive in many diverse fields. Examples include electronic health records with attributes like patient name, address, and health history; e-commerce product records with attributes like product name, description, price, and product rating; and scientific publication records containing attributes like author(s), publication title, and journal name One challenge in applying machine learning to real-world structured records like these examples is in deciding how to represent the record data. Structured records are often represented by one-hot encoded vectors or term frequency-inverse document frequency (TF-IDF) weighted vectors. These vectors are typically sparse and long, and are thus computationally expensive.

BRIEF DESCRIPTION OF DRAWINGS

Various embodiments in accordance with the present disclosure will be described with reference to the drawings, in which:

FIG. 3 depicts an exemplary representation of a token vocabulary and token embeddings associated with the structured records dataset shown in FIG. 2, according to some embodiments.

FIG. 4 depicts an exemplary representation of token embeddings associated with the structured records dataset shown in FIG. 2, according to some embodiments.

FIG. 6 depicts an exemplary representation of record embeddings for the structured records dataset shown in FIG. 2, according to some embodiments.

DETAILED DESCRIPTION

Figure 1:
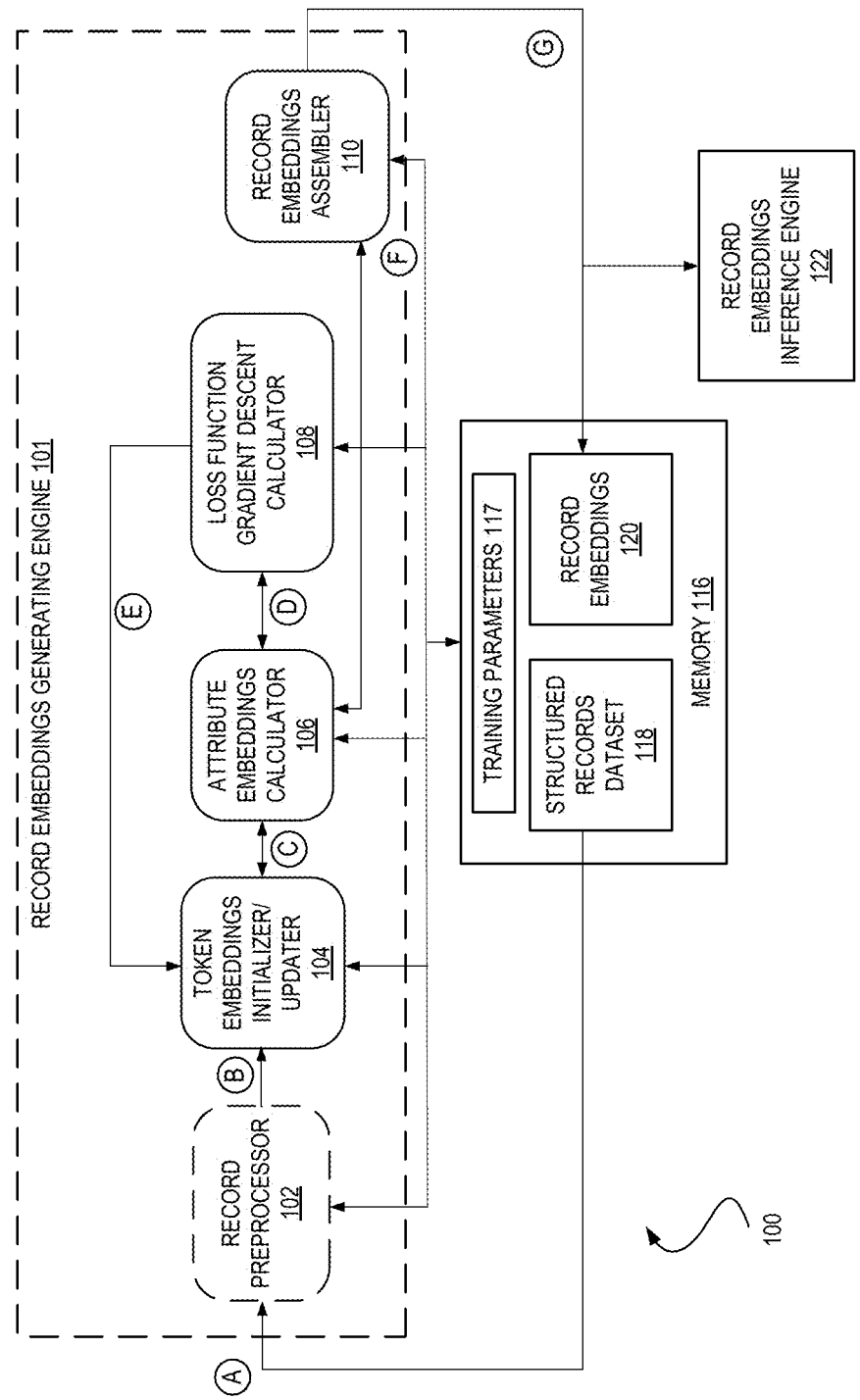
FIG. 1 is a diagram illustrating a system for training and using record embeddings, according to some embodiments.

Various embodiments of methods, apparatus, systems, and non-transitory computer-readable storage media for generating record embeddings for structured records are described. A structured records dataset includes one or more records with each record having a set of attributes and associated values. A record embedding is a set of values that represents a particular record by capturing semantic, syntactic, and/or structural features of the record. This set of values may also be referred to as a vector. Compared to the record attribute values from which the record embedding is derived, the vector is more suitable for use in matching, regression, and classification tasks, amongst other tasks. For example, two record embeddings may be mathematically compared to measure the likeness of the records they represent.

In various embodiments, one or more processors are programmed to generate a record embedding from a structured records dataset. Upon receiving a structured records dataset, the structured record dataset is preprocessed to generate a vocabulary of tokens. Each token has an associated token embedding (e.g., a set of values) such that, for example, when combined in matrix form, the token embeddings correspond to neuron weights in a neural network. A loss function is then defined that takes into account the record-attribute-value relationship, and the network is trained based on the loss function. Once optimized, the trained neuron weights (i.e., the token embeddings) are used to form record embeddings.

As will be apparent from the description herein, embodiments for generating record embeddings and the generated record embeddings themselves provide various benefits. Embodiments disclosed herein for generating record embeddings are unsupervised and do not require labeled structured records datasets (e.g., records that have been previously categorized into classes). Even without labeled training data, structures inherent in the data may be learned. As a result, the generation of record embeddings is particularly useful in cases where a limited amount of labeled data is available and for unsupervised learning tasks such as clustering. Even if a large amount of labeled data is available, embodiments detailed herein can be used to initialize embeddings in end-to-end neural network training for a specific application.

Embodiments can also be highly flexible in the handling of structured records. Data within a structured record may be treated generally as string tokens such as words, numbers, word n-grams, character n-grams, or any categorical label. As a result, the generating process and resulting record embeddings are agnostic to the type or form of the original structured records dataset and may be used across many different domains and fields.

Finally, in some embodiments, token embeddings are trained based in part on the inherent structure of the record.

As a result, the trained token embeddings make it straightforward to obtain record embeddings for new records without additional training or an expensive inference step.

The record embeddings that are generated also provide several advantages. As alluded to in the Background, structured records are sometimes represented with sparse and long one-hot encoded vectors, where there is a one-to-one correspondence between each token in a dataset and its one-hot encoded vector representation. The record embeddings of embodiments disclosed herein are relatively dense compared to one-hot encodings, resulting in reduced computational time and resource requirements when working with these record embeddings. Further, one-hot encoding techniques fail to capture similarities between tokens because the similarity between the two vector representations would be zero. It is desirable for the vector representation of the word "orange" to be more similar to the vector representation of the word "peach" than to the vector representation of the word "detergent." The disclosed record embeddings capture additional semantic details regarding tokens, permitting similarity determinations to be made.

FIG. 1 is a diagram illustrating a system 100 for generating and using record embeddings, according to some embodiments. System 100 includes a record embeddings generating engine 101 (which can be software, hardware, or a combination of both—e.g., executed as software on one or more processors, run by one or more application specific integrated circuits, run by one or more configured field programmable gate arrays, etc.), a memory 116, and a record embeddings inference engine 122 (which can be software, hardware, or a combination of both). Record embeddings generating engine 101 receives a structured records dataset from memory 116 and generates record embeddings. The record embeddings may be stored in memory 116 and/or output to record embeddings inference engine 122 for subsequent computing tasks.

Memory 116 may comprise one or more memories locally connected to the processor(s) associated with the record embeddings generating engine 101 and record embeddings inference engine 122, or remotely connected via a network, such as in a virtualized storage arrangement as will be described later herein.

Figure 2:
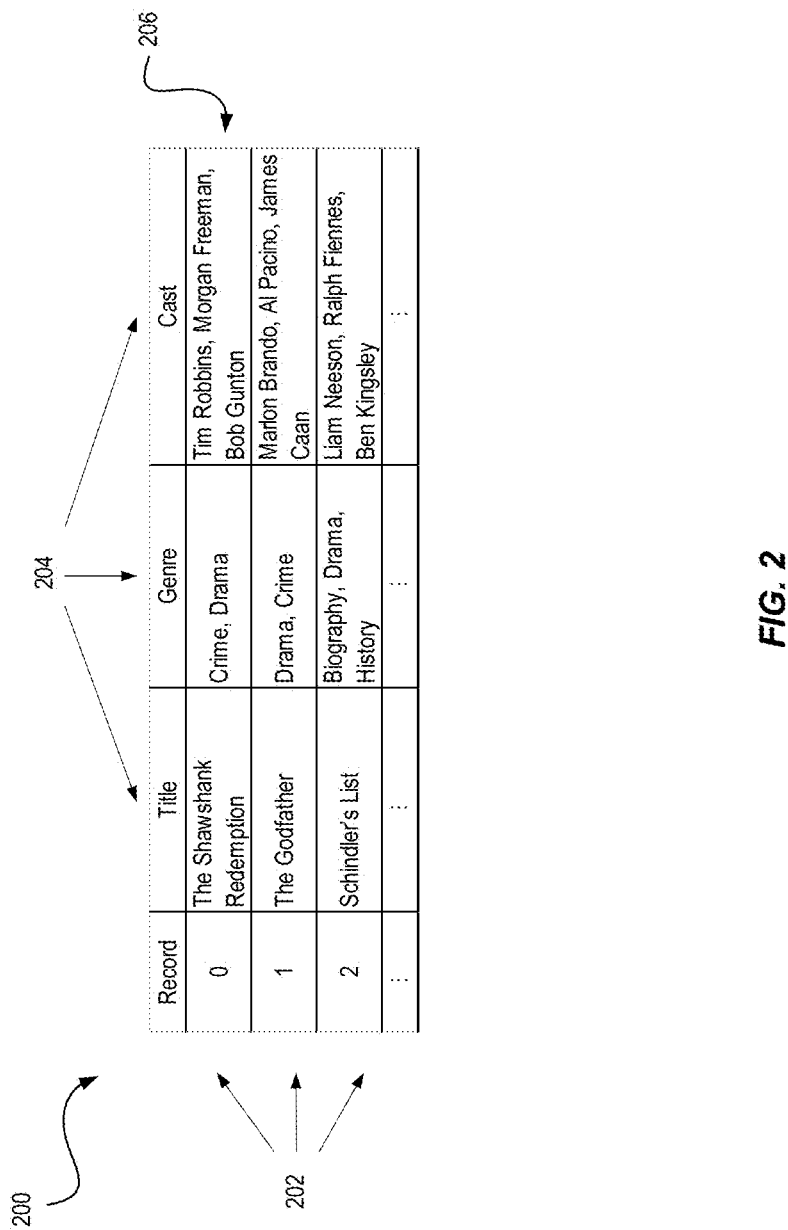
FIG. 2 depicts an exemplary structured records dataset, according to some embodiments.

FIG. 2 depicts an exemplary structured records dataset 200. The structured records dataset 200 includes one or more records 202 having attributes 204. Each record-attribute pair includes a corresponding value 206. Note that as illustrated, each of these records has three record-attribute pairs; however, it is to be understood that in various embodiments different types of records and/or different numbers of record-attribute pairs can be utilized. Values 206 may include strings, numbers, labels, encoded values, blanks, etc. These values 206 will be referred to as $attr_i^{(r)}$, where r indicates the record and i indicates the attribute. The exemplary structured records dataset 200 of FIG. 2 relates to movies and has three records 202 and three attributes 204: Title, Genre, and Cast. While the subsequent description of generating record embeddings refers to all three records and attributes in this example, in practice, all or some subset of records of a structured records dataset may be used (e.g., during training) and all or a subset of the attributes of records of a structured records dataset may be used (subject to the quality of the data, type of data, etc.). The structured records dataset 206 depicted in FIG. 2 serves as an example throughout the description.

Returning to FIG. 1, the record embeddings generating engine 101 includes components to generate record embeddings, including, in some embodiments, one or more of a record preprocessor 102, token embeddings initializer/updater 104, attribute embeddings calculator 106, loss function gradient descent calculator 108, record embeddings assembler 110. As would be apparent to one of skill in the art, the components of record embeddings generating engine 101 and their respective responsibilities may be consolidated or re-distributed amongst components (including those not shown) without departing from the scope of the disclosure.

At circle A, the record preprocessor 102 receives all or part of a structured records dataset 118 and, optionally, definitions as described below. Alternatively, the record preprocessor 102 may receive a location of the structured records dataset 118 and, possibly, a location of the definitions. The record preprocessor 102 may then retrieve or obtain data from the received location(s). At circle B, after processing the structured records dataset 118 as described herein, the record preprocessor 102 outputs a token vocabulary to the token embeddings initializer/updater 104 or stores the token vocabulary in memory 116 (not shown) and outputs the location of the token vocabulary. At circle C, after initializing or updating the token embeddings, the token embeddings initializer/updater 104 outputs the token embeddings to the attribute embeddings calculator 106, stores the token embeddings in memory 116 (not shown) and outputs the location of the token embeddings, or otherwise makes the token embeddings available to the attribute embeddings calculator 106. At circle D, while training, the attribute embeddings calculator 106 makes attribute embeddings available to the loss function gradient descent calculator 108, again either as an output or via a location in memory 116. At circle E, the loss function gradient descent calculator 108 sends updated token embeddings to the token embeddings initializer/updater 104 to update the token embeddings, which may be stored in memory 116. At circle F, after training, records embeddings assembler 110 receives final attribute embeddings or their location in memory 116 from the attribute embeddings calculator 106, which are based on the token embeddings. At circle G, the formed record embeddings 120 are stored in memory 116 or otherwise made available to record embeddings inference engine 122.

Record Preprocessor 102

In some embodiments, the record preprocessor 102 component receives a structured records dataset and processes it into a form applicable to a machine learning model. This processing may include normalizing, tokenizing, and/or filtering the received structured records dataset to build a vocabulary of tokens for use in downstream training processes. The structured records dataset 118 may have a form like the exemplary structured record depicted in FIG. 2. Definitions specify all or part of the structure and form of the structured records dataset 118 so that it can be broken down, as described below. The definitions may be automatically generated from a database or other repository from where the structured records dataset 118 originates, or user-defined. In some embodiments, the record preprocessor 102 scans the structured records dataset 118 according to the received definitions or some defined format to identify records, the attributes associated with those records, and the value(s) associated with those attributes.

The record preprocessor 102 normalizes a structured records dataset. Normalization entails operations such as stripping or masking unnecessary symbols, punctuation, capitalization, and the like for tokenization. For example, the record preprocessor 102 may strip or mask hyphens from the dataset to capture noun-phrases, or "'s" to eliminate possessives. In some embodiments, the specifics of normalization operations are specified in training parameters 117, which may be stored in memory 116.

The record preprocessor 102 also tokenizes a structured records dataset. Tokenization generates a rough token vocabulary, which may be subject to later additions or removals of tokens as described below. The disclosed technique for generating record embeddings is general. Data within a structured records dataset may be broken into tokens such as words, numbers, word n-grams, character n-grams, or any type of categorical label. Thus, tokenization may occur based on a pre-defined pattern or types of characters, length of characters, or the like. For example, whitespace may serve as a delimiter to capture word tokens. Alternatively, a pattern (e.g., three sequences of non-whitespace delimited by whitespace) may capture sequences of words, a fixed length may be used to capture character n-grams, etc.

Note that in some embodiments, certain values within a structured records dataset may be omitted by the record preprocessor 102 when generating the token vocabulary. The omitted values may be re-added to the record embeddings, as described herein. For example, if the definitions indicated a structured records dataset included an attribute with numeric values or fixed labels, that attribute and its associated values may be omitted from the data used to generate the token vocabulary.

Record preprocessor 102 may filter the token vocabulary output from tokenization or may filter the dataset prior to tokenization. For example, record preprocessor 102 may filter frequently occurring words such as stopwords common to the language of the dataset (e.g., "the," "is," "at," etc.). Additionally, record preprocessor 102 may filter out words that occur infrequently in the dataset and would be difficult to train. These infrequent words may be identified using term frequency-inverse document frequency (TF-IDF) or the like, and may be filtered out based on a frequency threshold that may be present in training parameters 117.

Record preprocessor 102 may also add tokens to the token vocabulary. For example, a generic token may be used to identify the infrequently occurring words that were filtered out. Additionally, specially tagged attribute name tokens may be added to identify attributes 204. These attribute name tokens may aid in building associations between values and attributes during the training process, and be used to represent record attributes with missing or empty values, which may still be informative. For example, if an attribute "shoe size" was used to describe e-commerce products, then a record with an empty "shoe size" value may indicate that the item is not a shoe. Thus, an attribute with no value may be treated as having a value corresponding to the attribute name token.

In some embodiments, the record preprocessor 102 builds a data structure that identifies all of the tokens associated with a particular record-attribute pair in the original structured records dataset. Optionally, the data structure includes information specifying the sequence of tokens as they appear in the value of for a particular attribute. The data structure may later be updated with the token embeddings associated with each token and be used to lookup token embeddings when calculating an attribute embedding, both of which are described below.

Each of the above described operations carried about by the record preprocessor 102 may be configured by one or more parameters in the training parameters 117.

FIG. 3 depicts an exemplary representation of a token vocabulary 300 corresponding to the structured records dataset shown in FIG. 2. In this instance, record preprocessor 102 has stripped punctuation and capitalization and tokenized values on word boundaries. Record preprocessor 102 has not included attribute name tokens or eliminated stopwords or other infrequently occurring words. Assuming the token vocabulary is a sequential list of tokens, the data structure would indicate that the tokens corresponding to the "Title" attribute of Record 1 are "0" and "11,", which correspond to the positions of the tokens "the" and "godfather," respectively, in the list.

Token Embeddings Initializer/Updater 104

Turning back to FIG. 1, token initializer/updater 104 receives a token vocabulary, or the location of the token vocabulary, from the record preprocessor 102 and initializes a token embedding for each token in the vocabulary. Additionally, the token initializer/updater 104 may receive updated token embeddings during training from the loss function gradient descent calculator 108, described below. The initial and updated token embeddings may be stored in memory 116 (not shown).

Upon receiving a token vocabulary, the token initializer/updater 104 initializes a vector for each token in the vocabulary. In some embodiments, these vectors have a fixed length $D_{em}$, which may be stored as a parameter in training parameters 117. Each vector is initialized with a set of random numbers. In some embodiments, the set of random numbers may be drawn from a standard normal distribution centered at zero. The token initializer/updater 104 may further normalize the random set of numbers so that each vector has unit magnitude. In some embodiments, token vectors are initialized with pre-trained word embeddings that were developed independent of the structured records dataset.

The initialized vectors correspond to the token embeddings which will be trained as described herein. Assuming there are $N_{token}$ tokens in the vocabulary, the $N_{token}$ embeddings of length $D_{em}$ form a matrix of values which correspond to hidden layer weights in a neural network.

Figure 13:
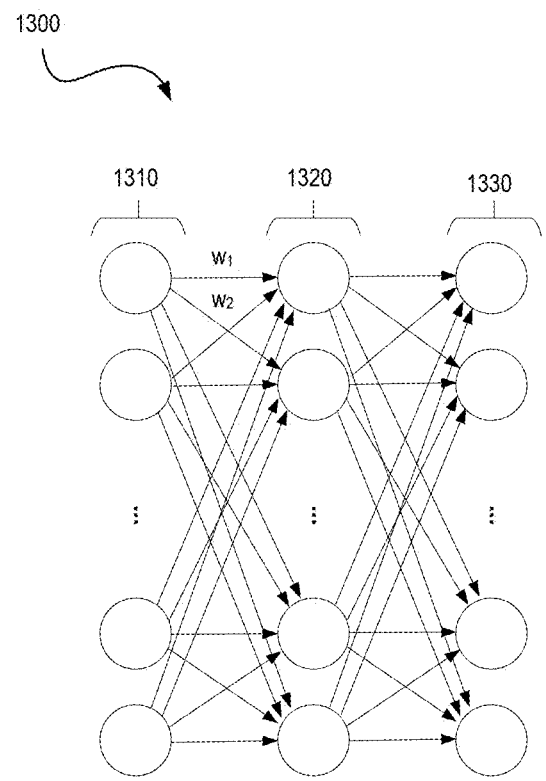
FIG. 13 illustrates an exemplary neural network that may be used to train the token embeddings in some embodiments or to use the record embeddings for inference in some embodiments.

FIG. 13 depicts an exemplary neural network 1300 that may be used to train the token embeddings in some embodiments or to use the record embeddings for inference in some embodiments. Neural network 1300 includes an input layer 1310, a hidden layer 1320, and an output layer 1330. The matrix of token embeddings may be used as weights to each input of each neuron of the hidden layer (only two weights—$w_1$ and $w_2$—are shown).

FIG. 4 depicts an exemplary representation of the token embeddings 400 associated with the structured records dataset shown in FIG. 2. For reference, token embeddings are referred to herein as $tokenEm_t$, where t identifies the token. Each token embedding 410 consists of a vector of length $D_{em}$, having randomly initialized (and, optionally, normalized) values ($the_1$ through $the_{Dem}$).

Attribute Embeddings Calculator 106

With reference to FIG. 1, the attribute embeddings calculator 106 is responsible for deriving attribute embeddings from token embeddings. Attribute embeddings are the unit of comparison used in the training of the token embeddings. By deriving attribute embeddings based on token embeddings and according to the record structure, the attribute embeddings calculator 106 captures that structure in the embeddings. In some embodiments, an attribute embedding is calculated by averaging the token embeddings associated with that attribute for a given record. This results in an attribute embedding that is the same length as the token embeddings (e.g., $D_{em}$). In other embodiments, the token embeddings are weighted according to some distribution such as the global frequency of a given token in that attribute or the like.

Figure 5:
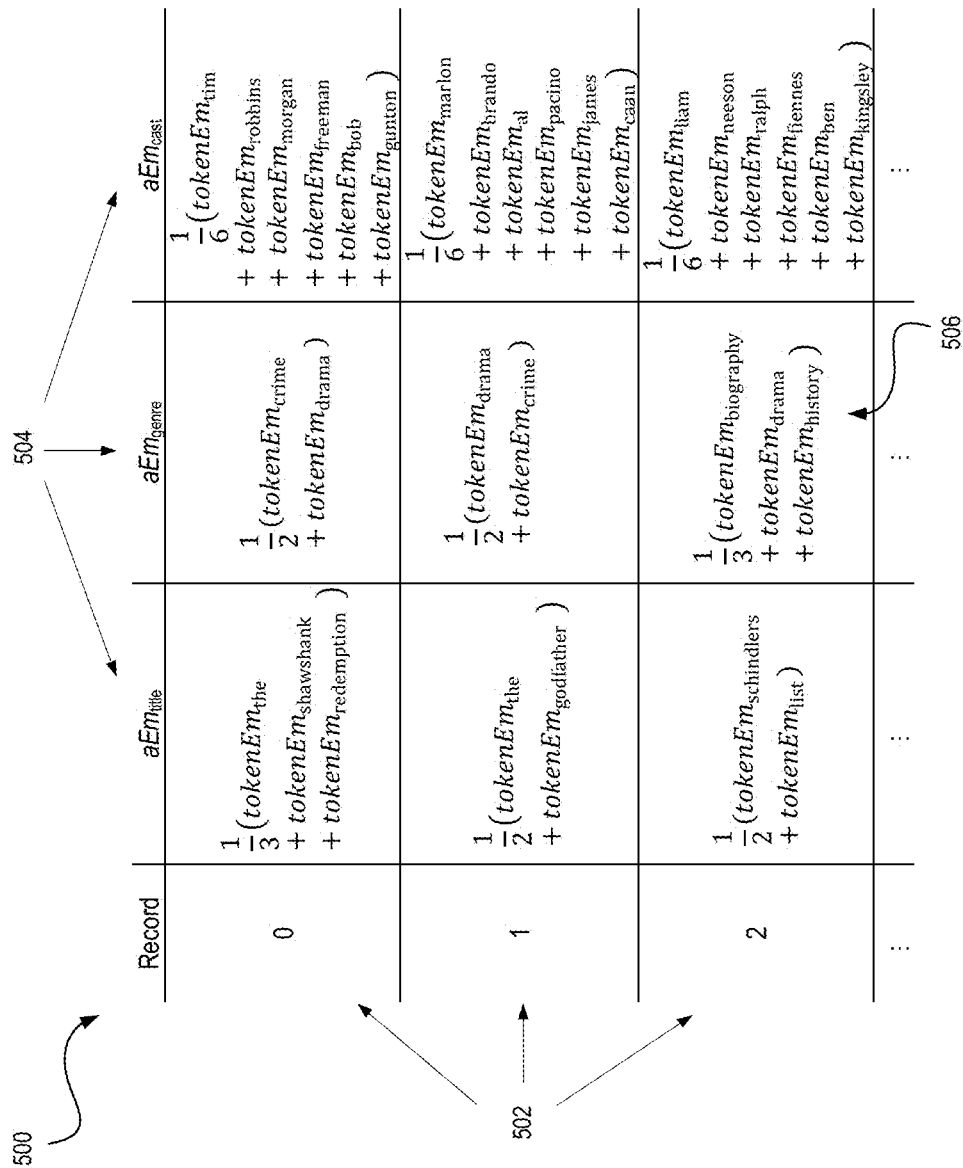
FIG. 5 depicts an exemplary representation of attribute embeddings for the structured records dataset shown in FIG. 2, according to some embodiments.

FIG. 5 illustrates one example of deriving attribute embeddings for the structured records dataset shown in FIG. 2. For each attribute of a given record, there exists an attribute embedding. Attribute embeddings will be referred to as $aEm_{attr}^{(r)}$, where r indicates the record and attr identifies the attribute. Taking attribute embedding 506 as an example, when averaging is used to derive the attribute embedding from the token embedding(s), $aEm_{genre}^{(2)}$ is equal to $\frac{1}{3}$(tokenEm$_{biography}$+tokenEm$_{drama}$+tokenEm$_{history}$). The attribute embedding for a given attribute may be given by:

$$aEm_j^r = \frac{1}{N_j^r} \sum_{t \in attr_j^r} tokenEm_t,$$

where $N_j^r$ and $attr_j^r$ are the number of tokens and the set of tokens, respectively, found in attribute j for record r, t selects each of the token embeddings for all tokens in the selected set of tokens.

Note that in some cases a token may appear multiple times in an attribute for a given record. When averaging to form attribute embeddings, the token embedding associated with the multiple-occurring token will be added multiple times in the attribute embedding calculation.

Although not the case in the exemplary structured records dataset, when attribute name tokens or infrequent word tokens are included in the token vocabulary, they too would be included in the attribute embedding calculations.

Regardless of the means for calculating the attribute embedding from token embeddings, in some embodiments, the attribute embeddings calculator 106 refers to the data structure assembled by the record preprocessor 102 to lookup tokens in a record's attributes.

Loss Function Gradient Descent Calculator 108

Returning to FIG. 1, the loss function gradient descent calculator 108 receives or retrieves attribute embeddings from the attribute embeddings calculator 106 or memory 116, and, based on a loss function that defines the overall training goal, calculates token embedding updates. By sequentially updating the token embeddings (e.g., the weights in the hidden layer of a neural network), the embeddings are trained. In one embodiment, the loss function sought to be optimized is based on the triplet loss function:

$d(a,p,n) = \text{cosineDist}(a,p) - \text{cosineDist}(a,n) + \alpha.$

In the above formula, a is an anchor sample, p is a positive sample, n is a negative sample, and a is a margin parameter. The objective is to differentiate the cosine distance between vector pairs (a, p) and (a, n) by the margin, α. In some embodiments, a may be a training parameter 117 and set to some value between 0 and 1 (e.g., 0.5).

In one training approach for the above described token and attribute embeddings, a goal would be to predict an attribute for a record given the other attributes in the record. For example, for a scientific reference, given the publication title, authors and venue, the goal would be to estimate the year in which the reference was published. Under this approach, triplets for the above loss function may constructed by omitting an attribute from a record to be used as the positive sample, determining an anchor from the remaining attributes of the record, and randomly sampling a corresponding attribute from different record. In this manner, the loss function to be minimized for all records ($N_r$), attributes ($N_{attr}$), and negative samples ($N_{neg}$) is:

$$\text{Loss} = \sum_{r=1}^{N_r} \sum_{i=1}^{N_{attr}} \sum_{n=1}^{N_{neg}} \max(0, d(\text{anchor}_i^r, aEm_i^r, aEm_i^{r \neq n})),$$

where r identifies a selected record, i identifies the omitted attribute in that record, n identifies a negative sample, $aEm_i^r$ is the positive sample omitted from the selected record, $aEm_i^{r \neq n}$ is the negative sample selected from the pool of corresponding attribute of different records (i.e., $aEm_i^{\neg r}$, and the anchor is an element-wise average of each of the remaining attributes of the selected record:

$$\text{anchor}_i^r = \frac{1}{N_{attr} - 1} \Sigma_{j \neq i}^{N_{attr}} aEm_j^r,$$

where j identifies the remaining attributes in the record, and $aEm_j^r$ is as defined above. In some embodiments, the anchor is the element-wise sum of each of the remaining attributes of the selected record (omitting the $$\frac{1}{N_{attr} - 1}$$

term). To avoid errant results, negative samples that happen to match the positive sample should be avoided (i.e., in cases where $aEm_i^r = aEm_i^{\neg r}$) because the cosine distance between the vector pairs would be zero. These "collisions" may reduce the overall number of training triplets.

With reference to the attribute embeddings depicted in FIG. 5, one training triplet may include:
(1) an anchor that is the average of two attribute embeddings from record 0 (e.g., $aEm_{title}^0$ and $aEm_{genre}^0$),
(2) a positive sample from the same record (e.g., $aEm_{cast}^0$), and
(3) a negative sample from a different record (e.g., $aEm_{cast}^1$).

Another training triplet may include:
(1) an anchor that is the average of two attribute embeddings from record 0 (e.g., $aEm_{title}^1$ and $aEm_{cast}^1$),
(2) a positive sample from the same record (e.g., $aEm_{drama}^1$), and
(3) a negative sample (e.g., $aEm_{genre}^2$). (Note that $aEm_{genre}^1$ is unavailable because its value is equal to the positive sample).

In a second training approach for the above described token and attribute embeddings, a goal would be to develop a record embedding which one known attribute may be used to predict another unknown attribute of the record. Triplets under this approach may be constructed by selecting one attribute embedding from a record as the anchor, selecting another attribute embedding from the same record as the positive sample, and a third attribute embedding from a different record as the negative sample. In this manner, the loss function to be minimized for all records ($N_r$), attributes ($N_{attr}$), and negative samples ($N_{neg}$) is:

$$\text{Loss} = \sum_{r=1}^{N_r} \sum_{i=1}^{N_{attr}} \sum_{j \neq i}^{N_{attr}} \sum_{n=1}^{N_{neg}} \max(0, d(aEm_j^r, aEm_i^r, aEm_i^{r \neq n})),$$

where the anchor sample, $aEm_j^r$, and positive sample, $aEm_i^r$, are selected from the same record and the negative sample, $aEm_i^{r\neq n}$, is selected from the pool of corresponding negative attribute of different records (i.e., $aEm_i^{\neg r}$).

Under both training approaches, the loss function is defined using attribute embeddings, which are in turn derived from token embeddings by the attribute embeddings calculator 106. As a result, the token embeddings are trained in a manner that includes associations of tokens across attributes and within attributes. Additionally, the pool of negative samples for a given anchor-sample positive-sample pair may include the corresponding attributes from all of the other records or may be some smaller subset thereof. The number of negative samples to evaluate against a given anchor-sample positive-sample pair may be set by a training parameter 117. In some embodiments, the number of negative samples may be based on the relative number of training triplets (proportional to the number of records and attributes) and the number of tokens in the vocabulary. Note that in the case where there are only two attributes per record, the first approach is equivalent to the second approach as the anchor sample reduces to the only other available attribute in a record.

The loss function gradient descent calculator 108 may evaluate a single triplet set (a, p, n), all of the available triplet sets, or some subset of thereof with the gradient of the loss function to produce updated token embeddings (i.e., the weights in the neural network). Various techniques of optimizing the gradient descent process may be used, such as the "Adam" gradient descent optimization technique. The updated token embeddings may be based on the previous token embeddings (i.e., the weights) used to evaluate the triplet set(s), an average of the corresponding gradients for the evaluated triplet set(s), and a learning rate, which may be a parameter in the training parameters 117.

The process of updating token embeddings, evaluating the gradient of the loss function, and making corresponding updates to the token embeddings may continue for all triplet sets in the dataset (i.e., one epoch) up to a maximum number of epochs, which may be a parameter in the training parameters 117. In some embodiments, the maximum number of training epochs may be 50. Once training is complete, the record embeddings may be generated.

Record Embeddings Assembler 110

The record embeddings assembler 110 forms record embeddings from the trained token embeddings for records in the structured records dataset 118 ($N_r$). In some embodiments, a record embedding is concatenation of attribute embeddings associated with the record in a predetermined sequence. Thus, for a record with $N_{attr}$ attributes and having token and thus attribute embeddings of size $D_{em}$, a record embedding is a vector of size $N_{attr} \times D_{em}$. To preserve attribute indices, empty attributes in a record may be assigned a zeros-vector of length $D_{em}$. Other record embedding formats may be used.

FIG. 6 depicts an exemplary representation of record embeddings for the structured records dataset shown in FIG. 2. A record embedding 610 includes concatenated (indicated by the I symbol) attribute embeddings. The set of record embeddings 620 includes a record embedding for each record in the structured records dataset 118.

As noted above, the record preprocessor 102 may omit certain attributes from the token vocabulary, such as attributes with a fixed set of labels or numeric attributes. These attributes may be represented in vector form and concatenated to the end of the record embeddings by the record embeddings assembler 110.

The records embedding assembler may further generate record embeddings for new records that were not in the structured records dataset at the time the token embeddings were trained. In this scenario, the record embeddings are assembled as above.

Record Embeddings Inference Engine 122

The record embeddings described herein represent records in a structured records dataset by capturing semantic, syntactic, and/or structural features of the record. As a result, these token and record embeddings may be used in a variety of downstream tasks that may be implemented via record embeddings inference engine 122. For example, record embeddings may be used in record matching tasks to identify duplicate records by permitting a distance measurement between two record embeddings to be used in identifying matches, subject to some match criterion. One such duplicate detection task may involve identifying duplicate papers found in differently indexed bibliographic sources. Another duplicate detection task may involve identifying the same product being sold by different vendors. As another example, record embeddings are useful to predict missing attributes both within records and across records given that they are composed of attribute embeddings. For example, given a particular movie cast, the record embeddings may be able to predict the movie's rating based on other movies having similar cast from the inter-record relationships represented in the embedding. Alternatively, an inference engine may be able predict the movie's rating from the cast alone. In many of these examples, the record embeddings are used to predict attributes of records that unknown or unspecified in the structured records dataset (e.g., "is record X similar to record Y?).

Flow

Figure 7:
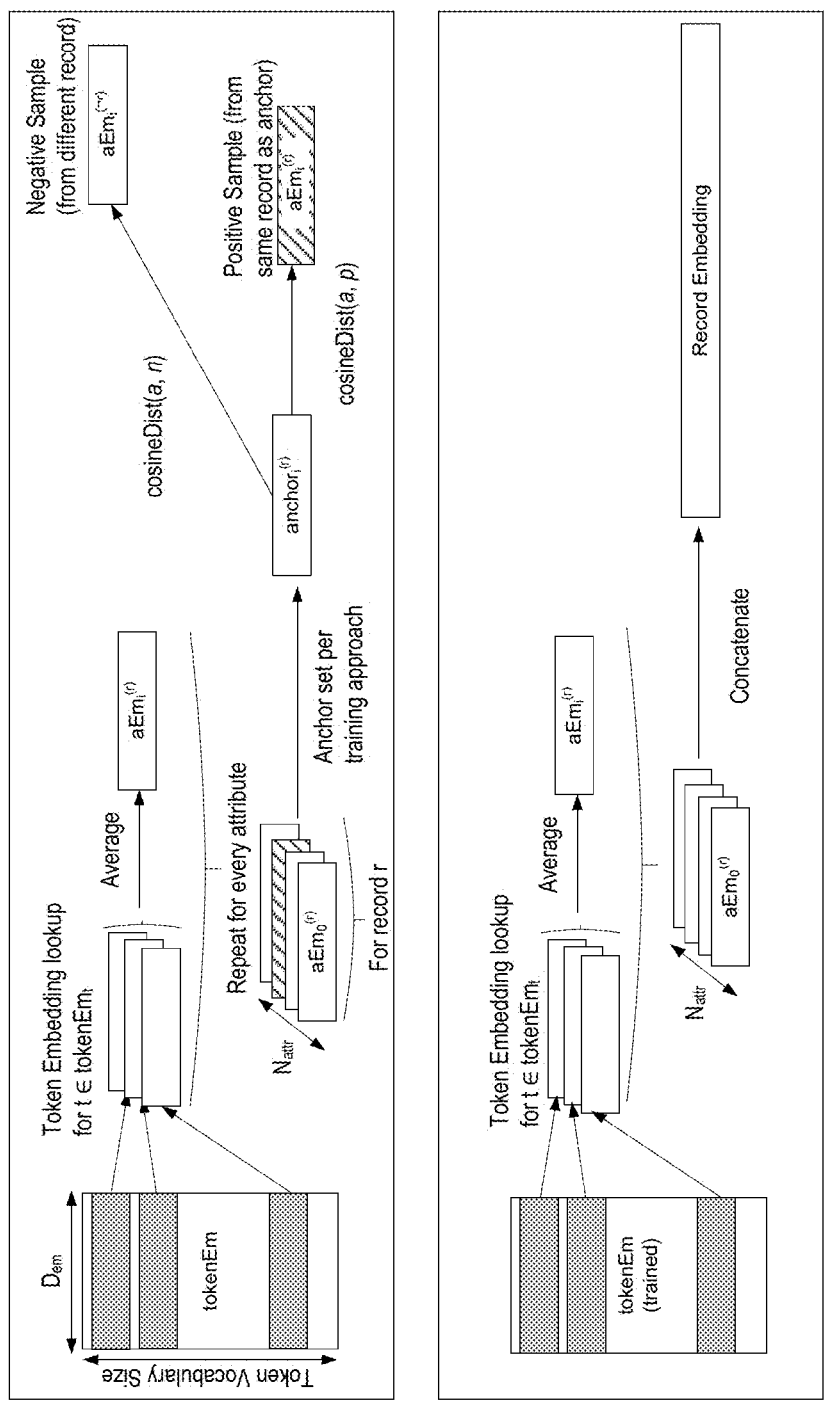
FIG. 7 depicts an exemplary process for training token embeddings and generating record embeddings.

FIG. 7 depicts an exemplary training process overview for training token embeddings and generating record embeddings. In the top half of FIG. 7, for a given record, the token embeddings for each attribute are looked up in the token embeddings. The token embeddings for each attribute are averaged to form attribute embeddings. One of the attribute embeddings in the record is selected to serve as a positive sample, the anchor is determined based on the particular training approach, and an attribute embedding from another record is used as the negative sample. In the bottom half of FIG. 7, the record embeddings are generated by calculating, as described above, an attribute embedding for each attribute of a record and concatenating the attribute embeddings to form a record embedding.

Figure 8:
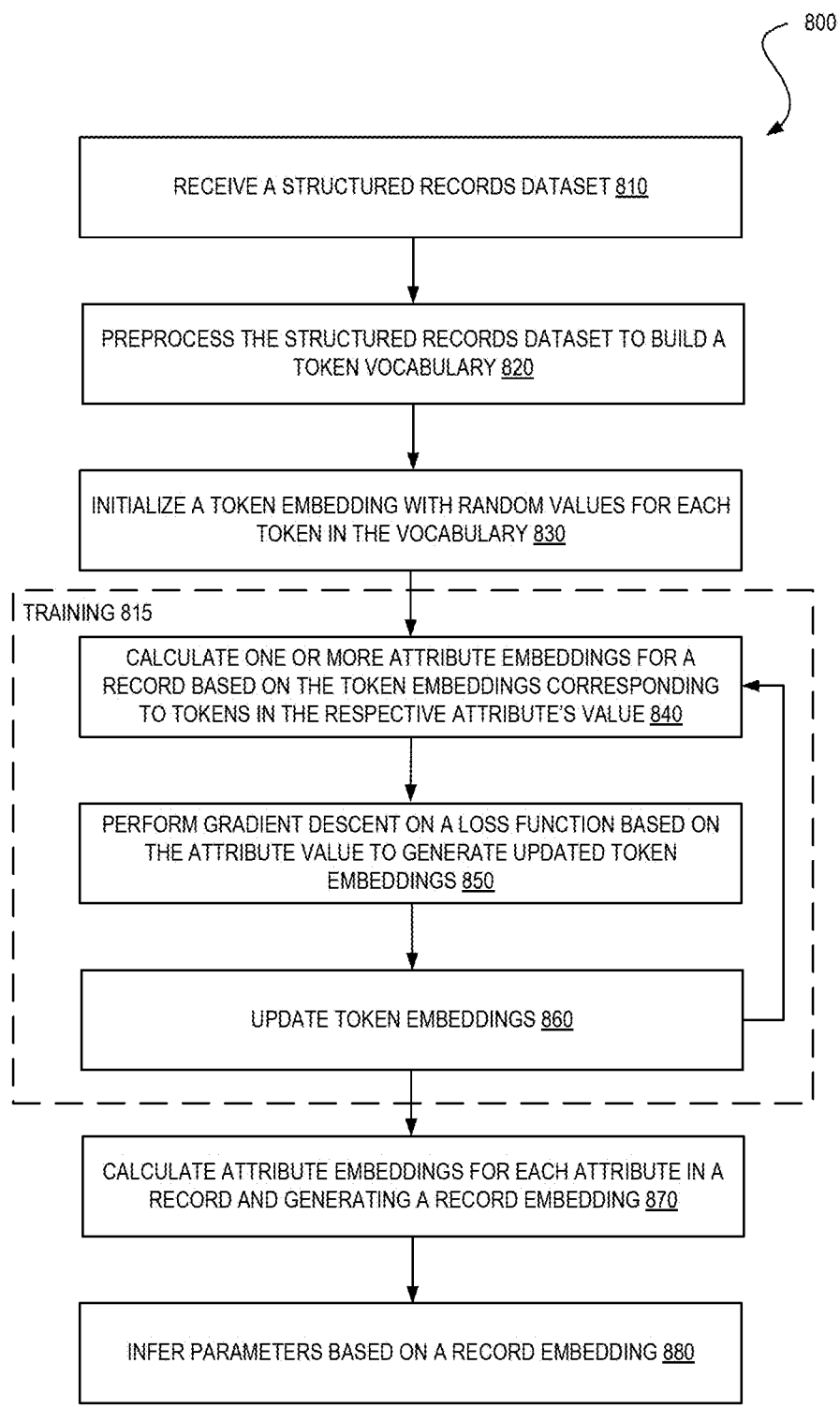
FIG. 8 is a flow diagram illustrating operations for record embedding training and inference, according to some embodiments.

FIG. 8 is a flow diagram illustrating operations of a method 800 for record embedding training and inference, according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by one or more of customer devices 1102A or 1102B, hardware virtualization service 1102, or computer system 1200 of the other figures, or distributed amongst the same.

The operations 800 include, at block 810, receiving a structured records dataset. A structured record generally includes a number of records having attributes. The structured records may be stored locally or on a remote system. In some embodiments, only a location of the structured records dataset may be received, and the processor(s) performing the operation may have to retrieve the structured records dataset. A definitions file may be sent alongside or bundled with the structured records dataset that includes information regarding the structure and format of the structured records database. The operations 800 include, at block 820, preprocessing the structured records dataset to build a token vocabulary. The preprocessing may include normalizing, filtering, and tokenizing the data in the structured records dataset. The operations 800 include, at block 830, initializing a token embedding with random values for each token in the vocabulary. The magnitude of the token embeddings may be normalized to one. The operations 800 include, at block 840, calculating one or more attribute embeddings for a record based on the token embeddings corresponding to tokens in the respective attribute's value. In some embodiments, the token embeddings associated with a particular attribute may be averaged to form an attribute embedding. The operations 800 include, at block 850, performing gradient descent on a loss function based on the attribute value to generated updated token embeddings. In some embodiments, the loss function may be the triplet loss function having a set of parameters based on the calculated attribute embeddings. The operations 800 include, at block 860, updating the token embeddings. The process may return to operation 840 for a number of iterations until the token embeddings are trained. The operations 800 include, at block 870, calculating attribute embeddings for each attribute in a record and generating a record embedding. In some embodiments, a record embedding may be based on the respective attribute embeddings, which in turn are based on the trained token embeddings. The operations 800 include, at block 880, inferring parameters based on a record embedding. Some exemplary inferring tasks include predicting attributes for a record with unknown attribute values, and clustering records. As shown in FIG. 8, the operations shown at blocks 810, 820, 830, 870, and 880 may be performed together or separately from each other and from the training operations shown at blocks 840, 850, and 860. Additional details regarding the operations 800 are found in the description associated with FIGS. 1-7.

Figure 9:
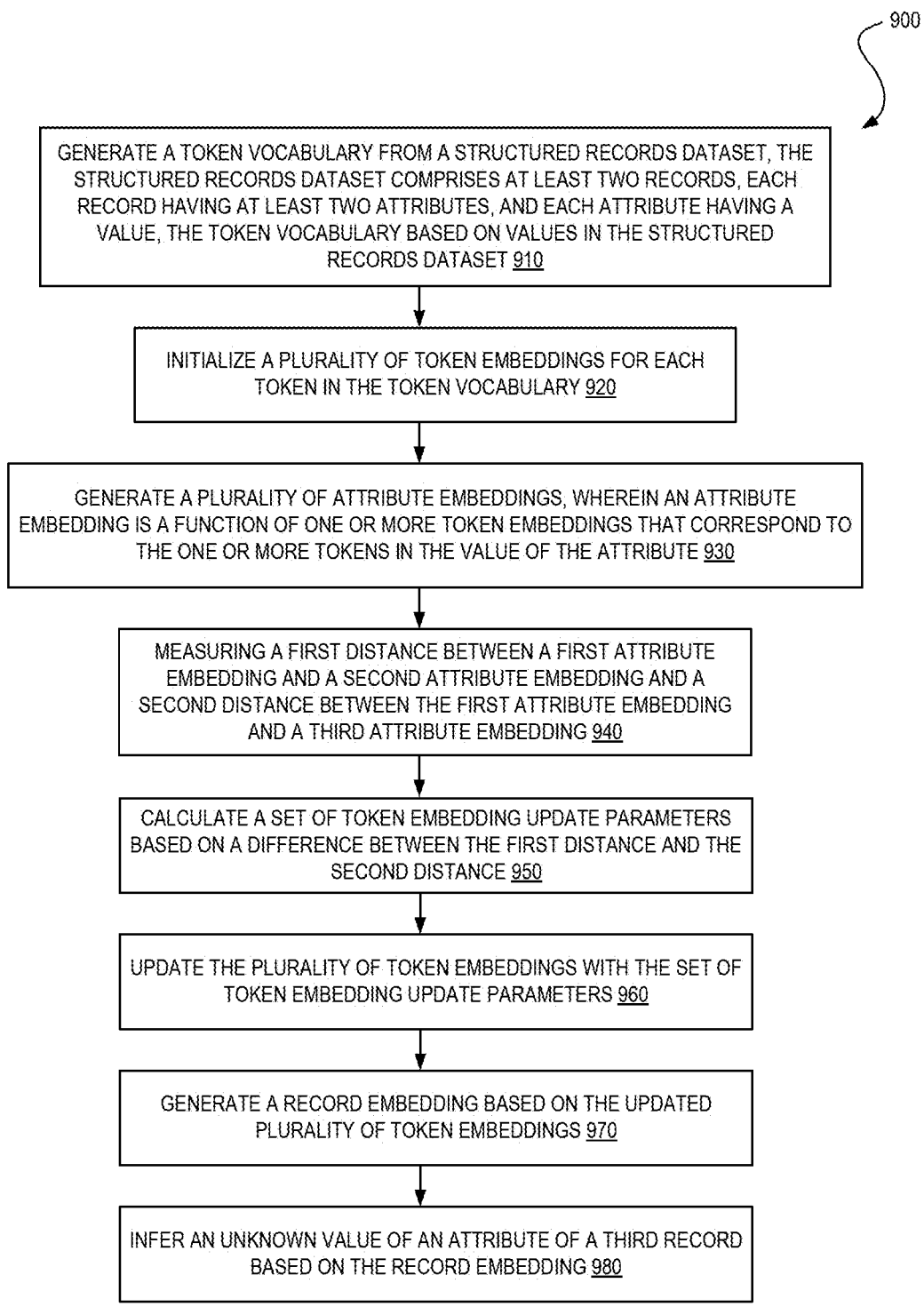
FIG. 9 is another flow diagram illustrating operations for record embedding training and inference, according to some embodiments.

FIG. 9 is a flow diagram illustrating operations of another method for record embedding training and inference, according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by one or more of customer devices 1002A or 1002B, hardware virtualization service 1002, or computer system 1100 of the other figures, or distributed amongst the same.

The operations 900 include, at block 910, generating a token vocabulary from a structured records dataset, the structured records dataset comprises at least two records, each record having at least two attributes, and each attribute having a value, the token vocabulary based on values in the structured records dataset. At block 920, initializing a plurality of token embeddings for each token in the token vocabulary. At block 930, generating a plurality of attribute embeddings, wherein an attribute embedding is a function of one or more token embeddings that correspond to the one or more tokens in the value of the attribute. At block 940, measuring a first distance between a first attribute embedding and a second attribute embedding and a second distance between the first attribute embedding and a third attribute embedding. At block 950, calculating a set of token embedding update parameters based on a difference between the first distance and the second distance. At block 960, updating the plurality of token embeddings with the set of token embedding update parameters. At block 970, generating a record embedding based on the updated plurality of token embeddings. At block 980, inferring an unknown value of an attribute of a third record based on the record embedding. Additional details regarding the operations 900 are found in the description associated with FIGS. 1-7.

Figure 10:
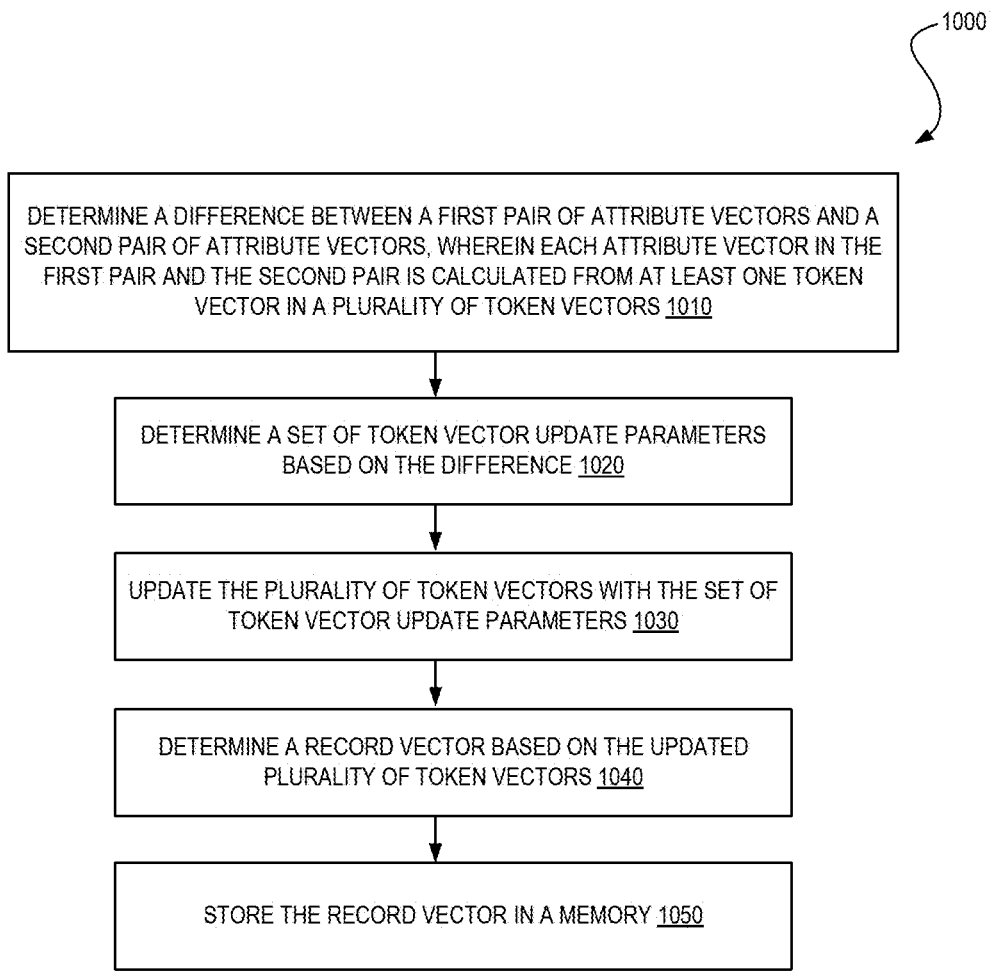
FIG. 10 is another flow diagram illustrating operations for record embedding training and inference, according to some embodiments.

FIG. 10 is another flow diagram illustrating operations for record embedding training and inference, according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by one or more of customer devices 1002A or 1002B, hardware virtualization service 1002, or computer system 1100 of the other figures, or distributed amongst the same.

The operations 1000 include, at block 1010, determining a difference between a first pair of attribute vectors and a second pair of attribute vectors, wherein each attribute vector in the first pair and the second pair is calculated from at least one token vector in a plurality of token vectors. At block 1020, determining a set of token vector update parameters based on the difference. At block 1030, updating the plurality of token vectors with the set of token vector update parameters. At block 1040, determining a record vector based on the updated plurality of token vectors. At block 1050, storing the record vector in a memory. Additional details regarding the operations 1000 are found in the description associated with FIGS. 1-7.

Illustrative Systems

Figure 11:
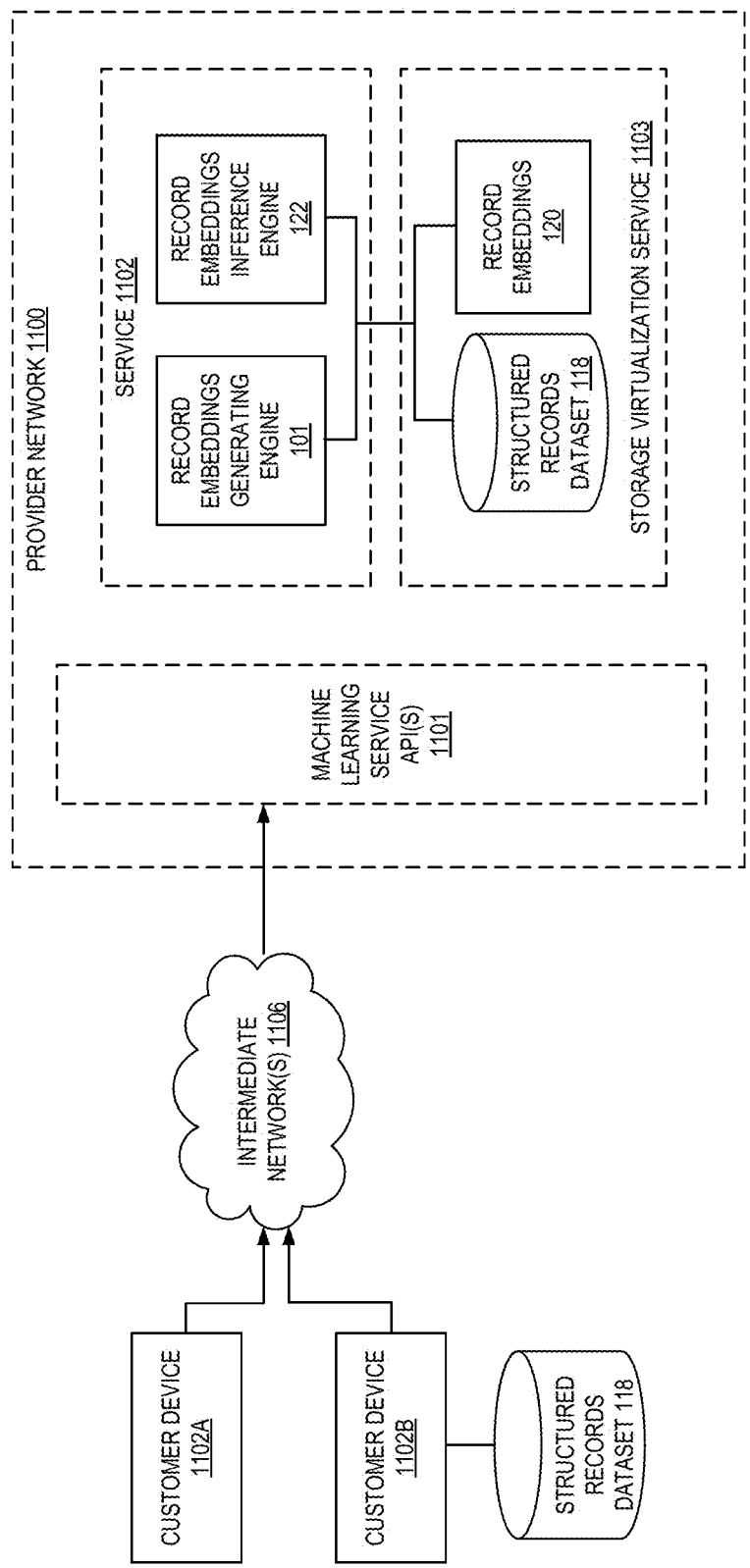
FIG. 11 illustrates an example of a computing environment for implementing aspects in accordance with various embodiments.

FIG. 11 illustrates an example of a computing environment for implementing aspects in accordance with various embodiments. A provider network 1100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 1100 may utilize one or more user accounts that are associated with a customer account, though these terms may be used somewhat interchangeably depend ending upon the context of use. Users may interact with a provider network 1100 across one or more intermediate networks 1106 (e.g., the internal via one or more interface(s), such as through use of application programming interface (API) calls, via a console implemented as a website or application, etc. The interface(s) may be part of, or serve as a front-end to, a control plane of the provider network 1100 that includes "backend" services supporting and enabling the services that may be more directly offered to customers.

To provide these and other computing resource services, provider networks 1100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In the case of the embedding training and usage techniques described herein, a provider network 1100 may make various machine learning service APIs 1101 available to customers. The machine learning service API(s) 1101 may rely on a service 1102, such as a machine learning service, and a storage virtualization service 1103. The record embeddings generating engine 101 and/or record embeddings inference engine 122 may be realized on service 1102 or a customer device 1102A, 1102B, and the memory 116 may be realized storage virtualization service 1103.

Figure 12:
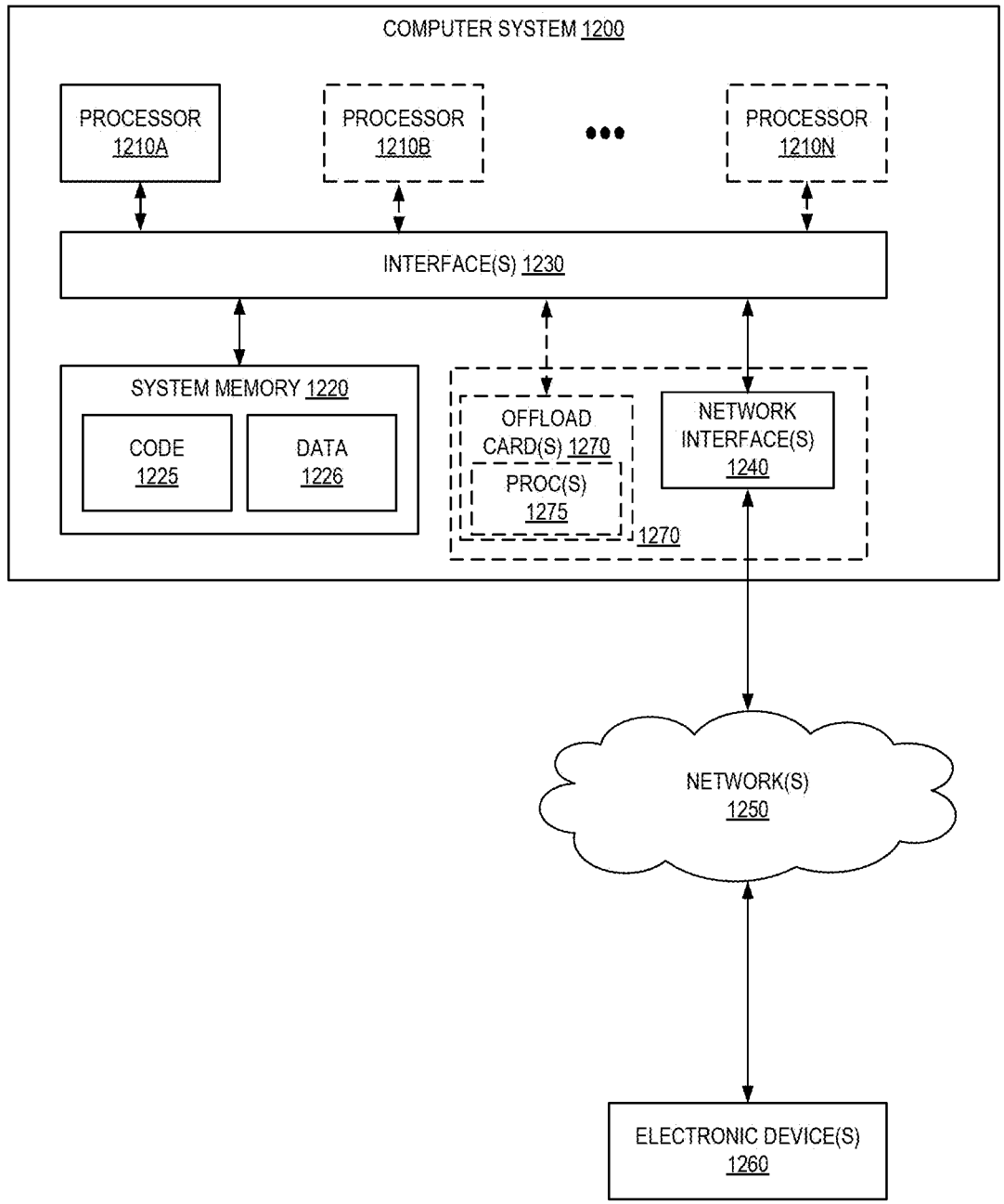
FIG. 12 illustrates a block diagram of an example computer system that may be used in some embodiments.

FIG. 12 a block diagram illustrating an example computer system that may be used in some embodiments. In some embodiments, a system that implements a portion or all of the techniques for embedding training and usage as described herein with reference to FIGS. 1-5 may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for generating record embeddings, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments described or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HyperText Transfer Protocol (HTTP) servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as described above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1002A-1002B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a token vocabulary from a structured records dataset, the structured records dataset comprises at least two records, each record having at least two attributes, and each attribute having a value, the token vocabulary based on values in the structured records dataset;
training a neural network by:
    initializing a plurality of token embeddings for each token in the token vocabulary, wherein the initialized plurality of token embeddings represent a plurality of untrained weights in the neural network;
    generating a plurality of attribute embeddings, wherein an attribute embedding is a function of one or more token embeddings that correspond to the one or more tokens in the value of the attribute;
    measuring a first distance between the first attribute embedding and the second attribute embedding and a second distance between the first attribute embedding and the third attribute embedding;
    determining a set of token embedding update parameters based on a difference between the first distance and the second distance;
    updating the plurality of token embeddings with the set of token embedding update parameters, wherein the updated plurality of token embeddings represent a plurality of trained weights in the neural network; and
generating a record embedding based on the updated plurality of token embeddings.

2. The computer-implemented method of claim 1, wherein each of the plurality of token embeddings and each of the plurality of attribute embeddings are vectors of the same length, and the record embedding is at least twice the length of an attribute embedding.

3. A computer-implemented method comprising:
determining a difference between a first pair of attribute vectors and a second pair of attribute vectors, wherein each attribute vector in the first pair and the second pair is calculated from at least one token vector in a plurality of token vectors, wherein the plurality of token vectors is derived from a structured records dataset;
determining a set of token vector update parameters based on the difference;
updating the plurality of token vectors with the set of token vector update parameters wherein the updated plurality of token vectors represent a plurality of trained weights in a neural network;
determining a record vector based on the updated plurality of token vectors; and
storing the record vector in a memory.

4. The computer-implemented method of claim 3, wherein each of the attribute vectors, each of the token vectors, and the record vector are one-dimensional arrays of numbers.

5. The computer-implemented method of claim 4, wherein the structured records dataset comprises a plurality of records, each record comprising a plurality of attributes, each attribute comprising a value, each value comprising one or more tokens, and wherein the calculation of each attribute vector from at least one token vector in the plurality of token vectors comprises:
identifying, for a particular attribute of a particular record, a set of tokens within the value; and
averaging, element-wise, each token vector corresponding to a token within the set.

6. The computer-implemented method of claim 4, wherein determining the difference comprises:
calculating a first distance between a first attribute vector and a second attribute vector in the first pair of attribute vectors;
calculating a second distance between a first attribute vector and a second attribute vector in the second pair of attribute vectors; and
calculating the difference as the difference between the first distance and the second distance.

7. The computer-implemented method of claim 6, wherein calculating the first distance and calculating the second distance include calculating a cosine similarity between vectors.

8. The computer-implemented method of claim 3, wherein the difference is adjusted by a margin before calculating the set of token vector update parameters.

9. The computer-implemented method of claim 3, further comprising initializing the plurality of token vectors with random numbers.

10. A system comprising:
a storage virtualization service implemented by a first one or more electronic devices; and
a machine learning service implemented by a second one or more electronic devices, the machine learning service including instructions that upon execution cause the second one or more electronic devices to:
receive a structured records dataset;
generate a plurality of record vectors corresponding to records in the structured records dataset by:
    determining a difference between a first pair of attribute vectors and a second pair of attribute vectors, wherein each attribute vector in the first pair and the second pair is calculated from at least one token vector in a plurality of token vectors, wherein the plurality of token vectors is derived from a structured records dataset;
    determining a set of token vector update parameters based on the difference;
    updating the plurality of token vectors with the set of token vector update parameters, wherein the updated plurality of token embeddings represent a plurality of trained weights in the neural network;

determining the plurality of record vectors based on the updated plurality of token vectors; and store the plurality of record vectors in a memory provided by the storage virtualization service.

11. The system of claim 10, wherein each of the attribute vectors, each of the token vectors, and the record vector are one-dimensional arrays of numbers.

12. The system of claim 11, wherein the structured records dataset comprises a plurality of records, each record comprising a plurality of attributes, each attribute comprising a value, each value comprising one or more tokens, and wherein to calculate each attribute vector, the instructions upon execution cause the machine learning service to:

identify, for a particular attribute of a particular record, each token within the value; and average, element-wise, each token vector corresponds to each token within the value.

13. The system of claim 12, wherein the instructions further cause the second one or more electronic devices to infer an unknown value of an attribute of a record in the structured records dataset based on the record vector.

14. The system of claim 11, wherein to determine the difference, the instructions upon execution cause the machine learning service to:

calculate a first distance between a first attribute vector and a second attribute vector in the first pair of attribute vectors;

calculate a second distance between a first attribute vector and a second attribute vector in the second pair of attribute vectors; and calculate the difference as the difference between the first distance and the second distance.

15. The system of claim 14, wherein the first distance and the second distance are based on the cosine similarity between vectors.

16. The system of claim 10, wherein the difference is adjusted by a margin before calculating the set of token vector update parameters.

17. The system of claim 10, wherein the instructions further cause the second one or more electronic devices to initialize the plurality of token vectors with random numbers.

* * * * *